US007560194B2

(12) United States Patent
Lin et al.

(10) Patent No.: US 7,560,194 B2
(45) Date of Patent: Jul. 14, 2009

(54) HIGH IONIC CONDUCTIVITY GEL POLYMER ELECTROLYTE FOR RECHARGEBLE POLYMBER SECONDARY BATTERY

(75) Inventors: Yueh-Wei Lin, Hsinchu (TW); Jing-Pin Pan, Hsinchu (TW); Mao-Sung Wu, Hsinchu (TW); Jyh-Tsung Lee, Hsinchu (TW); Jung-Mu Hsu, Hsinchu (TW); Jung-Cheng Lin, Hsinchu (TW)

(73) Assignee: Industrial Technology Research Institute (TW)

( * ) Notice: Subject to any disclaimer, the term of this patent is extended or adjusted under 35 U.S.C. 154(b) by 817 days.

(21) Appl. No.: 11/304,708

(22) Filed: Dec. 16, 2005

(65) Prior Publication Data

US 2007/0141461 A1 Jun. 21, 2007

(51) Int. Cl.
*H01M 10/40* (2006.01)

(52) U.S. Cl. ........................ 429/303; 429/189; 429/300

(58) Field of Classification Search ................. 429/189, 429/300, 303

See application file for complete search history.

(56) References Cited

U.S. PATENT DOCUMENTS

| | | | | |
|---|---|---|---|---|
| 5,602,213 | A * | 2/1997 | Hsu et al. | 525/454 |
| 2008/0157021 | A1 * | 7/2008 | Wang et al. | 252/62.2 |
| 2008/0160404 | A1 * | 7/2008 | Lin et al. | 429/189 |
| 2008/0160405 | A1 * | 7/2008 | Yang et al. | 429/215 |
| 2008/0160418 | A1 * | 7/2008 | Pan et al. | 429/328 |
| 2008/0176141 | A1 * | 7/2008 | Pan et al. | 429/325 |

FOREIGN PATENT DOCUMENTS

JP 48055994 A * 8/1973

OTHER PUBLICATIONS

Pan et al. "Effect of Barbituric Acid on the Self-Polymerization Reaction of Bismaleimides", J. of Applied Polymer Science, vol. 45, (1992), pp. 103-109.*

* cited by examiner

*Primary Examiner*—Gregg Cantelmo
(74) *Attorney, Agent, or Firm*—Bacon & Thomas, PLLC

(57) ABSTRACT

The present invention is directed to a gel polymer electrolyte for use in rechargeable polymer secondary batteries and a precursor composition thereof. The precursor composition can be injected into an aluminum shell of a battery cell, which undergoes in-situ heating polymerization by heating and forms a gel polymer electrolyte penetrating a partition membrane therein. The precursor composition contains (meth) acrylic (acrylate) monomers and a modified bismaleimide oligomer resulting from a reaction of barbituric acid and bismaleimide.

21 Claims, 2 Drawing Sheets

HIGH IONIC CONDUCTIVITY GEL POLYMER ELECTROLYTE FOR RECHARGEBLE POLYMBER SECONDARY BATTERY

FIELD OF THE INVENTION

The present invention is directed to a gel polymer electrolyte for use in rechargeable polymer secondary batteries and a precursor composition thereof. Particularly, the precursor composition can be injected into an aluminum shell of a battery cell, which undergoes in-situ heating polymerization by heating and forms a gel polymer electrolyte penetrating a partition membrane therein.

BACKGROUND OF THE INVENTION

Along with the rapid development and availability of portable electronic products, lithium ion secondary batteries, due to their properties, including light in weight, high voltage, and high energy density, etc., have ever increasing demands in the modern era. Furthermore, the use of polymer electrolytes in the lithium ion secondary batteries has become more and more important and attracted wide attention in research for size reduction and increasing flexibility of the electronic products.

The advantages of using a polymer electrolyte in a lithium ion polymer battery include: free of the risk of leakage of electrolyte, capable of being used to produce a battery with an ultra-thin and large area or with an angle, light in weight, lower vapor pressure and lower auto-discharge rate. These advantages greatly increase the commercial applications of lithium ion secondary batteries.

In order to develop thin type batteries with a flexible and thin shell, there are currently a plurality of gel polymer materials, together with electrolyte compositions, under investigation and study. These gel polymer materials include poly (ethylene oxide) (PEO), poly(methyl methacrylate) (PMMA), Poly(vinylidene fluoride) (PVDF), polyacrylonitrile (PAN), and derivatives or co-polymers thereof. An ordinary process of producing a gel polymer electrolyte for a polymer battery comprises forming a film from the gel polymer electrolyte; removing the solvent from the film; mounting the polymer film between two layers of an active material and stacking the resulting composite or coating the polymer film on the surface of an active material to form a battery core; and injecting a liquid electrolyte into the battery shell and binding the electrode plates. Thus, the laminated structure of electrode plates will have reduced expansion or shrinkage during the association/dissociation of lithium ions in the course of the charge/discharge process. As a result, the batteries produced have a long operation lifespan. However, such a production process is complex.

SUMMARY OF THE INVENTION

A gel polymer electrolyte according to the present invention is free of the problem of electrolyte leakage. Thus, a battery so produced has a better reliability. Furthermore, such a gel polymer material has a good miscibility with the electrolyte; and the resulting bridge structure is capable of keeping the solvent inside the battery, so that the electrolyte retainability is good and the electrolyte has a high solubility to the lithium salt and a high ion conductivity. A polymer precursor formula according to the present invention can be injected into an aluminum shell of a battery cell by an ordinary liquid injection process, thereafter the precursor undergoes in-situ heating polymerization by heating and forms a gel polymer electrolyte penetrating a partition membrane therein, wherein two polymer precursors form cross-linked copolymers. Such a process is simple and convenient.

A polymer electrolyte composition for a lithium polymer secondary battery according to the present invention includes: (A) an electrolyte polymer precursor consisting of (1) a modified-bismaleimide oligomer (2) a polymerizable monomer or oligomer thereof, which can from a copolymer with (1); (B) a mixture solvent containing at least two solvents selected from a first type of solvent having an extremely high dielectric constant and a high viscosity, and a second type of solvent having a lower dielectric constant and a low viscosity, e.g. ethylene carbonate (EC), propylene carbonate (PC) and γ-butyrolactone (GBL) which have an extremely high dielectric constant; (C) a lithium dissociable salt such as $LiPF_6$, and $LiBF_4$, etc.; (D) a free radical initiator; and (E) additives, such as the common additives including vinylene carbonate, sulfites, sulfates, phosphonates, or derivatives thereof.

The above-mentioned polymer electrolyte precursor formula is injected into an aluminum shell of a battery cell according to an ordinary liquid electrolyte injection process. The battery cell is then sealed and the electrolyte precursor undergoes in-situ heating polymerization by heating and forms a gel polymer electrolyte penetrating a partition membrane therein, wherein the polymerization temperature is at 30~130° C., and the two monomers/oligomers in the polymer precursors form cross-linked type copolymers. The resulting gel polymer electrolyte will adhere to the positive and negative electrode plates, which renders the manufacturing process easier.

DETAILED DESCRIPTION OF THE INVENTION

Figure 1:
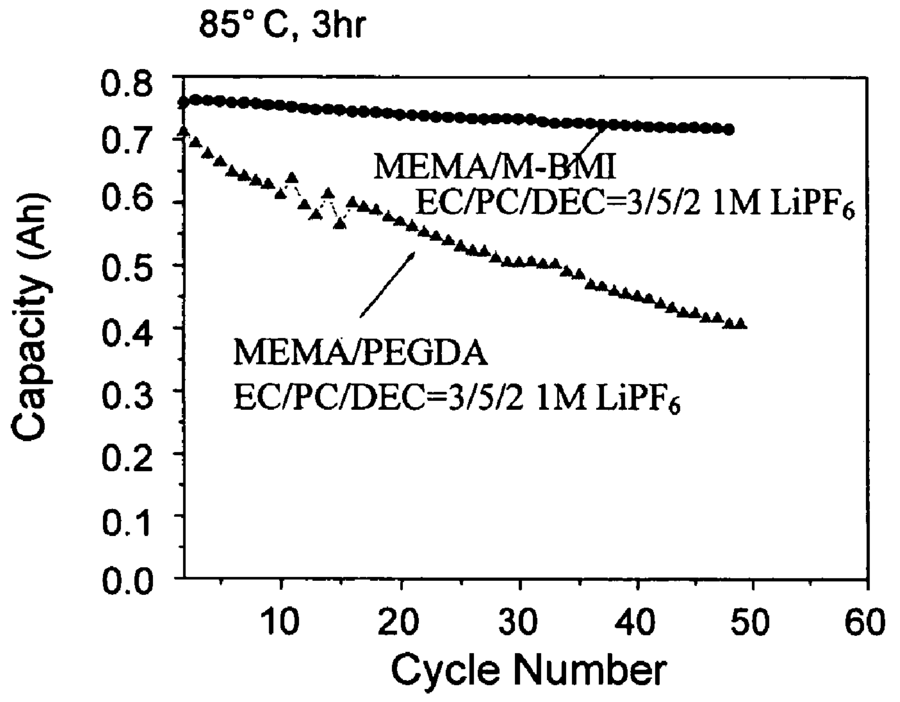
FIG. 1 shows the relationship between the capacity and the number of charge/discharge cycles for the gel polymer lithium secondary battery cells of the present invention and the prior art prepared in Example 6.
Figure 2:
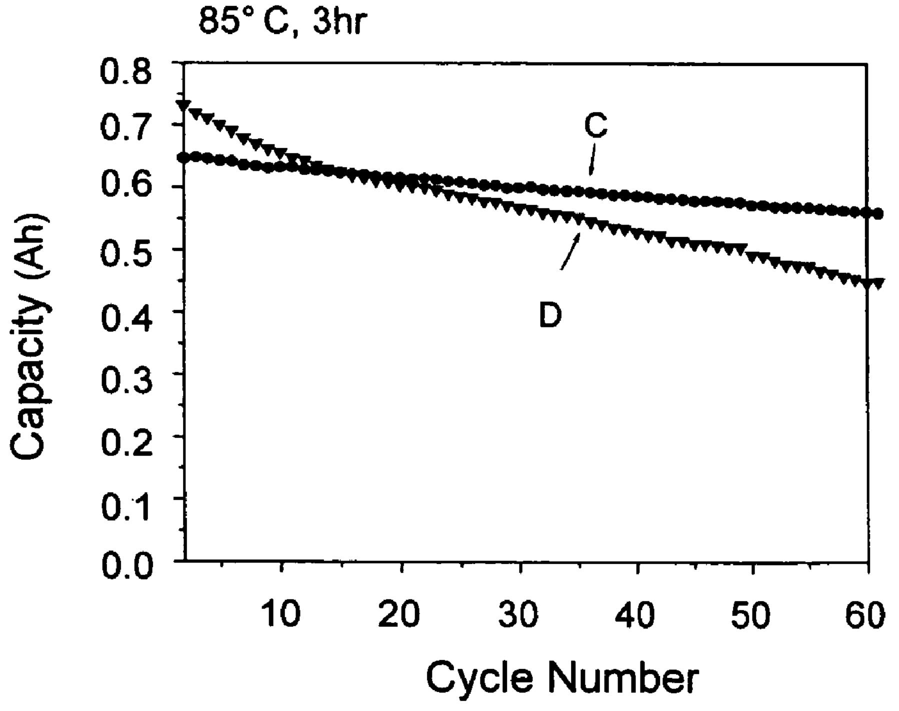
FIG. 2 shows the relationship between the capacity and the number of charge/discharge cycles for the gel polymer lithium secondary battery cells of the present invention and of the prior art prepared in Example 7.

Preferred embodiments of the present invention include (but not limited to) the followings:

1. A gel polymer electrolyte precursor composition for use in the fabrication of a secondary battery cell, which comprises:

a) a modified bismaleimide oligomer resulting from a reaction of barbituric acid with bismaleimide;

b) one or more acrylic/acrylate type monomer represented by $CH_2{=}C(R_0)C(O)O{-}(C_yH_{2y}O)_mR_1$, wherein y=1~3, m=0~9, $R_0$ is hydrogen or methyl, $R_1$ is selected from the group consisting of hydrogen, hydroxyl, C1-C6 alkyl, C1-C6 alkoxyl, C2-C6 alkenyl, C3-C6 cycloalkyl and phenyl; one or more nitrile type monomer represented by $R_2{-}CH{=}C(R_0)(CN)$, wherein $R_0$ has the same definition as the above, $R_2$ is selected from the group consisting of hydrogen, hydroxyl, C1-C6 alkyl, C1-C6 alkoxyl, C2-C6 alkenyl, C3-C6 cycloalkyl and phenyl; or an oligomer thereof;

c) a non-aqueous metal salt electrolyte;

d) an aprotic solvent; and e) a free radical initiator;

wherein, based on the total weight of (a) to (d), (a) constitutes 1-50%; (b) constitutes 1-50%; and (d) constitutes 10-90%, wherein (c) has a concentration of 0.5M to 2M in (d); and (e) is in an amount of 0.1-5%, based on the weight of (b).

2. The gel polymer electrolyte precursor composition as described in Item 1, wherein the ingredient (a) is prepared from one or more of the barbituric acid represented by the following formula:

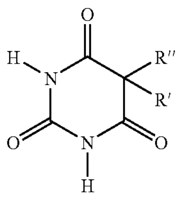

wherein R' and R" independently are —H, $-CH_3$, $-C_2H_5$, $-C_6H_5$, $-CH(CH_3)_2$, $-CH_2CH(CH_3)_2$, $-CH_2CH_2CH(CH_3)_2$, or $-C(CH_3)HCH(CH_3)_2$.

3. The gel polymer electrolyte precursor composition as described in Item 2, wherein R' and R" both are —H.

4. The gel polymer electrolyte precursor composition as described in Item 2, wherein the ingredient (a) is prepared from one or more bismaleimide represented by the following formula:

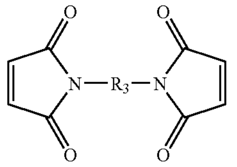

or

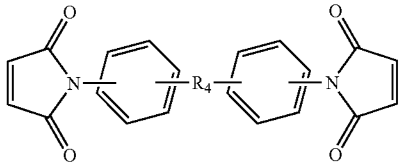

wherein $R_3$ is selected from the group consisting of C1-4 alkylene, $-CH_2NHCH_2-$, $-C_2H_4NHC_2H_4-$, $-C(O)CH_2-$, $-CH_2OCH_2-$, —C(O)—, —O—, —O—O—, —S—, —S—S—, —S(O)—, $-CH_2S(O)CH_2-$, —(O)S(O)—, $-CH_2(C_6H_4)CH_2-$, $-CH_2(C_6H)O-$, phenylene, biphenylene, substituted phenylene and substituted biphenylene; and $R_4$ is selected from the group consisting of C1-4 alkylene, —C(O)—, $-C(CH_3)_2-$, —O—, —O—O—, —S—, —S—S—, —(O)S(O)—, and —S(O)—.

5. The gel polymer electrolyte precursor composition as described in Item 4, wherein the bismaleimide is selected from the group consisting of N,N'-bismaleimide-4,4'-diphenylmethane, 1,1'-(methylenedi-4,1-phenylene)bismaleimide, N,N'-(1,1'-biphenyl-4,4'-diyl)bismaleimide, N,N'-(4-methyl-1,3-phenylene)bismaleimide, 1,1'-(3,3'dimethyl-1,1'-biphenyl-4,4'-diyl)bismaleimide, N,N'-ethylenedimaleimide, N,N'-(1,2-phenylene)dimaleimide, N,N'-(1,3-phenylene)dimaleimide, 1,1'-hexanediyl-bis-pyrrole-2,5-dione, N,N'-bis-(2,5-dioxo-2,5-dihydro-pyrrole-1-carboxyl)-methylenediamine, 1,1'-(3,3'-piperazine-1,4-diyl-dipropyl)bis-pyrrole-2,5-dione, N,N'-thiodimaleimid, N,N'-dithiodimaleimid, N,N'-ketonedimaleimid, N,N'-methylene-bis-maleinimid, bis-maleinimidomethyl-ether, 1,2-bis-(maleimido)-1,2-ethandiol, N,N'-4,4'-diphenylether-bis-maleimid, and 4,4'-bis(maleimido)-diphenylsulfone.

6. The gel polymer electrolyte precursor composition as described in Item 1, wherein the modified bismaleimide oligomer (a) is prepared by the reaction of barbituric acid with bismaleimide at 100~150° C. for 0.5~8 hours.

7. The gel polymer electrolyte precursor composition as described in Item 1, wherein the ingredient (b) comprises the acrylic/acrylate type monomer represented by $CH_2{=}C(R_0)C(O)O-(C_yH_{2y}O)_mR_1$, wherein y=1~3, m=1~9, $R_0$ is methyl, and $R_1$ is hydrogen.

8. The gel polymer electrolyte precursor composition as described in Item 7, wherein the ingredient (b) further comprises methyl methacrylate monomer.

9. The gel polymer electrolyte precursor composition as described in Item 1, wherein the ingredient (b) comprises methyl methacrylate monomer.

10. The gel polymer electrolyte precursor composition as described in Item 1, wherein the non-aqueous metal salt electrolyte (c) is selected from the group consisting of $LiPF_6$, $LiBF_4$, $LiAsF_6$, $LiSbF_6$, $LiClO_4$, $LiAlCl_4$, $LiGaCl_4$, $LiNO_3$, $LiC(SO_2CF_3)_3$, $LiN(SO_2CF_3)_2$, LiSCN, $LiO_3SCF_2CF_3$, $LiC_6F_5SO_3$, $LiO_2CCF_3$, $LiSO_3F$, $LiB(C_6H_5)_4$, $LiCF_3SO_3$ and a mixture thereof.

11. The gel polymer electrolyte precursor composition as described in Item 1, wherein the aprotic solvent (d) comprises a mixture solvent of two types of solvents, wherein the first type solvent has a high dielectric constant and a high viscosity, and the second type solvent has a relatively lower dielectric constant and a relatively lower viscosity; wherein the first type solvent is selected from the group consisting of ethylene carbonate (EC), propylene carbonate (PC), butylene carbonate, dipropyl carbonate, acid anhydride, N-methylpyrrolidone, N-methyl acetamide, N-methyl formamide, dimethyl formamide, γ-butyrolactone, acetonitrile, dimethyl sulfoxide and dimethyl sulfite; and the second type solvent is selected from the group consisting of ether, ester, and carbonate; wherein the ether is selected from the group consisting of 1,2-diethoxyethane, 1,2-dimethoxyethane, 1,2-dibutoxyethane, tetrahydrofuran, 2-methyl tetrahydrofuran, and propylene oxide; the ester is selected from the group consisting of methyl acetate, ethyl acetate, methyl butyrate, ethyl butyrate, methyl proionate, and ethyl propionate; and the carbonate is selected from the group consisting of dimethyl carbonate (DMC), diethyl carbonate (DEC) and ethyl methyl carbonate (EMC).

12. The gel polymer electrolyte precursor composition as described in Item 11, wherein the aprotic solvent (d) comprises ethylene carbonate (EC), propylene carbonate (PC), and diethyl carbonate (DEC).

13. The gel polymer electrolyte precursor composition as described in Item 12, wherein the aprotic solvent (d) comprises, based on volume, 10%-50% of ethylene carbonate (EC), 5%-80% of propylene carbonate (PC), and 3%-75% of diethyl carbonate (DEC).

14. The gel polymer electrolyte precursor composition as described in Item 1, wherein the free radical initiator (e) is selected from the group consisting of ketone peroxide, peroxy ketal, hydroperoxide, dialkyl peroxide, diacyl peroxide, peroxy ester, and azo compound.

15. The gel polymer electrolyte precursor composition as described in Item 1, wherein the free radical initiator (e) is selected from the group consisting of 2,2-azo-bis-isobutyronitrile (AIBN), phenyl-azo-triphenylmethane, t-butyl peroxide (TBP), cumyl peroxide, acetyl peroxide, benzoyl peroxide (BPO), lauroyl peroxide, t-butyl hydroperoxide, and t-butyl perbenzoate.

16. A polymer lithium secondary battery cell, which comprises:

i) a negative electrode capable of electrochemically migrating in/out alkali metal;

ii) a positive electrode including an electrode active material capable of electrochemically migrating in/out alkali metal; and iii) a gel polymer electrolyte capable of activating the negative electrode and the positive electrode, wherein the gel polymer electrolyte is prepared from a gel polymer electrolyte precursor composition as described in Item 1 by polymerization by heating.

17. The polymer lithium secondary battery cell as described in Item 16, wherein the negative electrode comprises a negative electrode active material selected from the group consisting of mesophase carbon microbeads (MCMB), vapor Grown varbon fiber (VGCF), carbon nano-tube (CNT), coke, carbon black, graphite, acetylene black, carbon fiber, and glassy carbon.

18. The polymer lithium secondary battery cell as described in Item 16, wherein the negative electrode further comprises a fluorine-containing resin binder.

19. The polymer lithium secondary battery cell as described in Item 16, wherein the electrode active material of the positive electrode is a lithium compound selected from the group consisting of oxide, sulfide, selenide, and telluride of vanadium, titanium, chromium, copper, molybdenum, niobium, iron, nickel, cobalt, or manganese.

20. The polymer lithium secondary battery cell as described in Item 17, wherein the positive electrode further comprises a fluorine-containing resin binder.

21. The polymer lithium secondary battery cell as described in Item 17, wherein the positive electrode further comprises an electrically conductive additive selected from the group consisting of acetylene black, carbon black, graphite, nickel powder, aluminum powder, titanium powder, and stainless steel powder, and a mixture thereof.

The present invention can be further understood through the following examples, which are for illustrative purposes only and not for limiting the scope of the present invention.

EXAMPLE 1

Preparation of Modified Bismaleimide Oligomer

Bismaleimide and barbituric acid were mixed in a molar ratio of 3/1~10/1, and then added with solvents γ-butyrolactone (GBL) or propylene carbonates. The resulting mixture was heated at 100~150° C. for reaction for 0.5~8 hours, thereby forming a modified bismaleimide oligomer. In this example, a modified bismaleimide oligomer was prepared at 130° C. according to the composition listed in Table 1.

TABLE 1

| | Weight |
|---|---|
| N,N'-bismaleimide-4,4'-diphenylmethane | 59.613 g |
| barbituric acid | 2.132 g |
| γ-butyrolactone, GBL | 247.059 g |

EXAMPLE 2

Preparation of Gel Polymer

In this example, gel polymers were prepared according to the formulas listed in Table 2 with or without the modified bismaleimide oligomer prepared from Table 1 in Example 1. Table 2 also lists the gelation time for the gel polymer formulas at 25° C. and 80° C., respectively.

TABLE 2

| | Gelation time (hour) | |
|---|---|---|
| Formula* | 25° C. | 80° C. |
| 1) AN: 5 g, PEGMA: 1 g | without gelation | <1 |
| 2) MMA: 5 g, PEGMA: 1 g | without gelation | <1 |
| 3) M-BMI: 5 g, PEGMA: 1 g | without gelation | <1 |
| 4) M-BMI: 25 g, PEGDA: 1 g | without gelation | <0.5 |
| 5) M-BMI: 25 g | without gelation | <0.5 |

*The formulae contain 1% of 2,2-azo-bis-isobutyronitrile (AIBN) free radical initiator, based on the total weight of monomers and oligomers
AN: acrylnitrile
MMA: methyl methacrylate
M-BMI: modified bismaleimide oligomer from Example 1
PEGMA: poly(ethylene glycol) methacrylate
PEGDA: poly(ethylene glycol) diacrylate The results in Table 2 show that the modified bismaleimide oligomer from Example 1, under heating and the presence of AIBN free radical initiator, can form a gel co-polymer or polymer at a relatively faster reaction rate (0.5~1 hour).

EXAMPLE 3

Preparation of Gel Polymer Electrolytes, and Ion Conductivities Thereof

This example used a plurality of formulas to prepare gel polymer electrolyte precursors, which were gelled at 80° C. An AC impedance analysis was used to measure the impedance of an ion diffusion segment. The measured value was used in an ion conductivity formula to obtain an ion conductivity, $\sigma = L/A \times R$, wherein $\sigma$ is the ion conductivity, L is thickness, A is area, and R is resistance.

A common preparation process included: mixing a lithium salt electrolyte with an aprotic solvent to obtain an electrolyte solution; preparing a mixture of monomer/oligomer/free radical initiator; mixing the electrolyte solution with the mixture to obtain a gel polymer electrolyte precursor; and heating the precursor to form a gel polymer electrolyte.

Table 3 listed the formulae of the conventional liquid electrolytes and gel polymer electrolytes according to the present invention, and the ion conductivity thereof.

TABLE 3

| Run | Formula | Gelation time (hour) | Ion conductivity at room temperature (mS/cm) |
|---|---|---|---|
| | 1.1 M $LiPF_6$ (3EC/2PC/5DEC) | — | 7.1 |
| | 1 M $LiPF_6$ EC/GBL | — | 10.1 |
| 1 | MMA:M-BMI = 1:1 (polymer precursor):(electrolyte solution)* = 18:82 M-BMI: 9% | <3 | — |

TABLE 3-continued

| Run | Formula | Gelation time (hour) | Ion conductivity at room temperature (mS/cm) |
|---|---|---|---|
| 2 | MMA:M-BMI = 2:1 (polymer precursor):(electrolyte solution)* = 14:86 M-BMI: 5% | <3 | 7.5 |
| 3 | MMA:M-BMI = 1:1 (polymer precursor):(electrolyte solution)* = 10:90 M-BMI: 5% | <3 | 9.3 |

*The electrolyte solution is 1M $LiPF_6$ in a mixed solvent of EC/GBL = 1/3.

The polymer precursor contains MMA and modified bismaleimide oligomer of Example 1 with 1% AIBN.

The experimental results of Table 3 indicate that the gel polymer electrolyte can be polymerized after being heated at 80° C., and the formula having 10 wt % of the polymer precursor and 5 wt % of the modified bismaleimide oligomer (M-BMI) of the present invention will result in a gel polymer electrolyte having a high ion conductivity of 9.3 mS/cm slightly smaller than 10.1 mS/cm of the conventional liquid electrolyte.

EXAMPLE 4

Preparation Gel Polymer Electrolytes, and Ion Conductivities Thereof

A gel polymer electrolyte was prepared by repeating the steps of Example 3, wherein the modified bismaleimide oligomer (M-BMI) of Example 1 and the poly(ethylene glycol) diacrylate (PEGDA) as a control were separately used in the polymer precursors in order to verify that a gel polymer electrolyte of the invention has a conspicuously improved ion conductivity. The compositions and results are listed in Table 4.

TABLE 4

| Run | Formula | Gelation time (80° C.) (hour) | Ion conductivity at room temperature (mS/cm) |
|---|---|---|---|
| 4 | MMA:PEGDA = 6:1 (polymer precursor):(electrolyte solution)* = 43:57 PGEDA: 6% (EC/GBL) | <3 | 1.2 |
| 5 | MMA:M-BMI = 6:1 (polymer precursor):(electrolyte solution)* = 43:57 M-BMI: 6% (EC/GBL) | <3 | 1.6 |
| 6 | MMA:PEGDA = 6:1 (polymer precursor):(electrolyte solution)* = 43:57 PEGDA: 6% (EC/PC) | <3 | 0.2 |
| 7 | MMA:M-BMI = 6:1 (polymer precursor):(electrolyte solution)* = 43:57 M-BMI: 6% (EC/PC) | <3 | 0.87 |

*The electrolyte solutions in Run 4 and Run 5 1M $LiPF_6$ in a mixed solvent of EC/GBL = 1/3. The electrolyte solutions in Run 6 and Run 7 are 1M $LiPF_6$ in a mixed solvent of EC/PC = 1/1.

The above-mentioned formulae of polymer precursor/electrolyte solution in Runs 4-7, after polymerization by heating at 80° C., form gel polymer electrolytes, wherein the electrolyte solutions in Runs 4 and 5 are 1M $LiPF_6$ in a mixed solvent of EC/GBL=⅓, and are 1M $LiPF_6$ in a mixed solvent of EC/PC=1/1 for Runs 6 and 7. In comparison with M-BMI and PEGDA in Runs 5 and 4, the gel polymer electrolytes of the present invention (Runs 5 and 7) have ion conductivities 1.25 and four times higher than those of the controls (Runs 4 and 6), respectively.

EXAMPLE 5

Preparation of Gel Polymer Electrolytes and Ion Conductivities Thereof

Gel polymer electrolytes were prepared by repeating the steps of Example 3, wherein the modified bismaleimide oligomer (M-BMI) of Example 1 and different monomers were separately used in the polymer precursors. Table 5 listed the compositions and results of the formulae used.

TABLE 5

| Run | Formula Composition* | Gelation time (80° C.) (hour) | Ion Conductivity at Room Temperature (mS/cm) |
|---|---|---|---|
| 8 | TEGEEA:M-BMI = 7:1 (polymer precursor):(electrolyte solution)* = 20:80 M-BMI: 3% (EC/GBL) | <3 | 4.75 |
| 9 | TEGEEA:PEGDMA330 = 7:1 (polymer precursor):(electrolyte solution)* = 20:80 PEGDMA: 3% (EC/GBL) | <3 | 4.57 |
| 10 | TEGEEA:PEGDA258 = 7:1 (polymer precursor):(electrolyte solution)* = 20:80 PEGDA258: 3% (EC/GBL) | <3 | 4.66 |
| 11 | MMA:PEGDA258 = 7:1 (polymer precursor):(electrolyte solution)* = 20:80 PEGDA258: 3% (EC/GBL) | <3 | 3.9 |

*The electrolyte solutions in Runs 8-11 are 1M $LiPF_6$ in a mixed solvent of EC/GBL = 1/3; TEGEEA: Tri(ethylene glycol) ethyl ether acrylate; PEGDMA: polyethylene glycol dimethacrylate Among the gel polymer electrolytes prepared in Runs 8 to 11, the one prepared with M-BMI of the present invention has the highest ion conductivity of 4.75 mS/cm.

Preparation and Capacity Properties of Gel Polymer Lithium Secondary Battery Cell A process for preparing a gel polymer lithium secondary battery cell comprises: preparation of positive and negative electrode plates, partition membrane, and gel polymer electrolyte containing polymer precursor and liquid electrolyte solution.

The positive and negative electrode plates were prepared the same way as in the conventional lithium ion secondary battery cell. The positive electrode slurry included 80~95% of $LiCoO_2$, 315% of acetylene black, and 3~10% of PVDF binder. The slurry was dissolved in NMP (N-methyl-2-pyrrolidone) solvent to form an ink-like slurry, which was uniformly coated on an aluminum foil sheet 300 m in length, 35 cm in width, and 20 μm in thickness. After being dried, the positive electrode sheet was calendered and striped, and finally, dried in vacuum at 110° C. for 4 hours. The positive electrode active material can be a lithium compound selected from oxide, sulfide, selenide, and telluride of vanadium, titanium, chromium, copper, molybdenum, niobium, iron, nickel, cobalt, and manganese, etc. The fluorine-containing resin binder can be, for example, poly(vinylidene fluoride) (PVDF). The electrically conductive active material can be selected from carbon black, graphite, acetylene black, nickel powder, aluminum powder, titanium powder, and stainless steel powder, etc.

The negative electrode slurry was prepared by dissolving 90 parts by weight of carbon powder with a diameter of 1 μm~30 μm in 10 parts by weight of a mixed solvent containing PVDF and NMP. After thoroughly mixing, the slurry was coated on a copper sheet 300 m in length, 35 cm in width, and 10 μm in thickness, and dried. The negative electrode sheet was calendered and striped, and finally, dried in vacuum at 110° C. for 4 hours. The negative electrode active material can be selected from mesophase carbon microbeads (MCMB), vapor grown carbon fiber (VGCF), carbon nano-tubes (CNT), coke, carbon black, graphite, acetylene black, carbon fiber, and glassy carbon. The fluorine-containing resin binder can be, for example, poly(vinylidene fluoride) (PVDF). The vacuum-dried positive/negative electrode stripes were placed in a dry environment, e.g. a glove case or a dry chamber.

EXAMPLE 6

Six battery cells were grouped into two sets of experiments. Experiment A used the following polymer precursor compositions: MEMA:M-BMI=7:1, the electrolyte solution was 1M $LiPF_6$ in a mixed solvent of EC/DEC/PC=3/5/2; and (polymer precursor): (electrolyte solution)=20:80, wherein M-BMI is 2.5 wt %, and MEMA is methoxy tri(ethylene glycol) methacrylate. Experiment B used the following polymer precursor composition: MEMA:PEGDA258=7:1, the electrolyte solution was 1M $LiPF_6$ in a mixed solvent of EC/DEC/PC=3/5/2; and (polymer precursor): (electrolyte solution)=20:80, i.e. PEGDA258 is 2.5 wt %. An aluminum foil bag of Model No. 383562 was used for the assembly of a polymer battery cell, which was heated at 85° C. for 3 hours so that the polymer precursor was polymerized inside the battery cell. The battery cells were set at a charge/discharge rate of 0.2C. As shown in the charge/discharge cycle of FIG. 1, the battery cells of Experiment A have an initial capacity of 760 mAh, and still have an capacity of 710 mAh after 50 cycles of charge/discharge. The battery cells of Experiment B have an initial capacity of 710 mAh, which is decreased to 410 mAh after 50 cycles of charge/discharge. The experimental results indicate that the battery cells prepared from the formula containing M-BMI have a better capacity after 50 cycles of charge/discharge, and a longer battery cell liftspan.

EXAMPLE 7

Six battery cells were grouped into two sets of experiments. Experiment C used the following polymer precursor compositions: MEMA:M-BMI=7:1, the electrolyte solution was 1M $LiPF_6$ in a mixed solvent of EC/GBL=⅓; and (polymer precursor):(electrolyte solution)=20:80, wherein M-BMI is 2.5 wt %, and MEMA is methoxy tri(ethylene glycol) methacrylate. Experiment D used the following polymer precursor composition: MEMA:PEGDA258=7:1, the electrolyte solution was 1M $LiPF_6$ in a mixed solvent of EC/GBL=⅓; and (polymer precursor):(electrolyte solution)=20:80, i.e. PEGDA258 is 2.5 wt %. An aluminum foil bag of Model No. 383562 was used for the assembly of a polymer battery cell, which was heated at 85° C. for 3 hours so that the polymer precursor was polymerized inside the battery cell. The battery cells were set at a charge/discharge rate of 0.2C. As shown in the charge/discharge cycle of FIG. 1, the battery cells of Experiment C have an initial capacity of 650 mAh, and still have an capacity of 560 mAh after 50 cycles of charge/discharge. The battery cells of Experiment D have an initial capacity of 730 mAh, which is decreased to 430 mAh after 50 cycles of charge/discharge. The experimental results indicate that the battery cells prepared from the formula containing M-BMI have a better capacity after 50 cycles of charge/discharge, and a longer battery cell liftspan.

EXAMPLE 8

Figure 3:
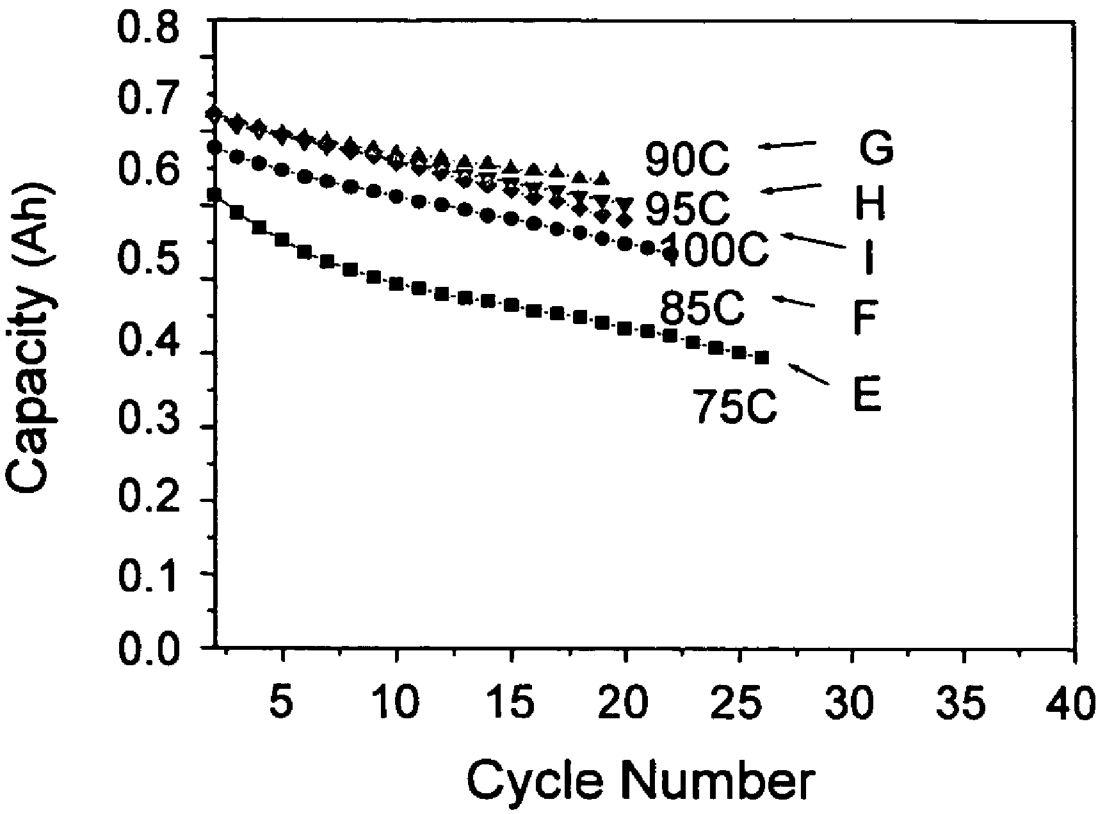
FIG. 3 shows the relationship between the capacity and the number of charge/discharge cycles for the gel polymer lithium secondary battery cells of the present invention prepared in Example 8 at different gelation temperatures.

Fifteen battery cells were grouped into five sets of experiments (E to I). Each set of experiment used the following polymer precursor compositions: MEMA:M-BMI=7:1, the electrolyte solution was 1M $LiPF_6$ in a mixed solvent pf EC/DEC/PC=3/5/2; and (polymer precursor):(electrolyte solution)=20:80, i.e. M-BMI: 2.5 wt %. An aluminum foil bag Model No. 383562 was used for the assembly of the polymer battery cell, which was heated at different temperatures for 3 hours so that the polymer precursor was polymerized inside the battery cell. The heating temperatures for Experiments E, F, G, H and I were, respectively, 75, 85, 90, 95 and 100° C. The battery cells were set at a charge/discharge rate of 0.2C, and the results are shown in FIG. 3. As shown in FIG. 3, the battery cells of Experiment G (90° C.) have a better battery lifespan, wherein the initial capacity is 660 mAh, and the capacity after 20 cycles of charge/discharge is 636 mAh.

The invention claimed is:

1. A gel polymer electrolyte precursor composition for use in the fabrication of a secondary battery cell, which comprises:

a) a modified bismaleimide oligomer resulting from a reaction of barbituric acid with bismaleimide;

b) one or more acrylic/acrylate type monomer represented by $CH_2{=}C(R_0)C(O)O{-}(C_yH_{2y}O)_mR_1$, wherein y=1~3, m=0~9' $R_0$ is hydrogen or methyl, $R_1$ is selected from the group consisting of hydrogen, hydroxyl, C1-C6 alkyl, C1-C6 alkoxyl, C2-C6 alkenyl, C3-C6 cycloalkyl and phenyl; one or more nitrile type monomer represented by $R_2{-}CH{=}C(R_0)(CN)$, wherein $R_0$ has the same definition as the above, $R_2$ is selected from the group consisting of hydrogen, hydroxyl, C1-C6 alkyl, C1-C6 alkoxyl, C2-C6 alkenyl, C3-C6 cycloalkyl and phenyl; or an oligomer thereof;

c) a non-aqueous metal salt electrolyte;

d) an aprotic solvent; and e) a free radical initiator;

wherein, based on the total weight of (a) to (d), (a) constitutes 1-50%; (b) constitutes 1-50%; and (d) constitutes 10-90%, wherein (c) has a concentration of 0.5M to 2M in (d); and (e) is in an amount of 0.1-5%, based on the weight of (b).

2. The gel polymer electrolyte precursor composition as claimed in claim 1, wherein the ingredient (a) is prepared from one or more of the barbituric acid represented by the following formula:

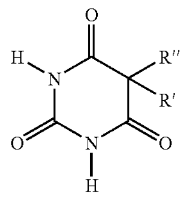

wherein R' and R" independently are —H, —$CH_3$, —$C_2H_5$, —$C_6H_5$, —$CH(CH_3)_2$, —$CH_2CH(CH_3)_2$, —$CH_2CH_2CH(CH_3)_2$, or —$C(CH_3)HCH(CH_3)_2$.

3. The gel polymer electrolyte precursor composition as claimed in claim 2, wherein R' and R" both are —H.

4. The gel polymer electrolyte precursor composition as claimed in claim 2, wherein the ingredient (a) is prepared from one or more bismaleimide represented by the following formula:

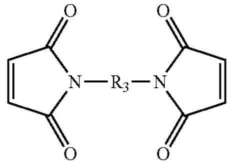

or

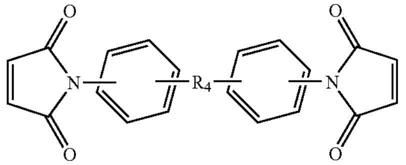

wherein $R_3$ is selected from the group consisting of $C_{1-4}$ alkylene, —$CH_2NHCH_2$—, —$C_2H_4NHC_2H_4$—, —C(O)$CH_2$—, —$CH_2OCH_2$—, —C(O)—, —O—, —O—O—, —S—, —S—S—, —S(O)—, —$CH_2S(O)CH_2$—, —(O)S(O)—, —$CH_2(C_6H_4)CH_2$—, —$CH_2(C_6H_4)O$—, phenylene, biphenylene, substituted phenylene and substituted biphenylene; and $R_4$ is selected from the group consisting of C1-4 alkylene, —C(O)—, —$C(CH_3)_2$—, —O—, —O—O—, —S—, —S—S—, —(O)S(O)—, and —S(O)—.

5. The gel polymer electrolyte precursor composition as claimed in claim 4, wherein the bismaleimide is selected from the group consisting of N,N'-bismaleimide-4,4'-diphenylmethane, 1,1'-(methylenedi-4,1-phenylene)bismaleimide, N,N'-(1,1'-biphenyl-4,4'-diyl)bismaleimide, N,N'-(4-methyl-1,3-phenylene)bismaleimide, 1,1'-(3,3'dimethyl-1,1'-biphenyl-4,4'-diyl)bismaleimide, N,N'-ethylenedimaleimide, N,N'-(1,2-phenylene)dimaleimide, N,N'-(1,3-phenylene)dimaleimide, 1,1'-hexanediyl-bis-pyrrole-2,5-dione, N,N'-bis-(2,5-dioxo-2,5-dihydro-pyrrole-1-carboxyl)-methylenediamine, 1,1'-(3,3'-piperazine-1,4-diyl-dipropyl)bis-pyrrole-2,5-dione, N,N'-thiodimaleimid, N,N'-dithiodimaleimid, N,N'-ketonedimaleimid, N,N'-methylene-bis-maleinimid, bis-maleinimidomethyl-ether, 1,2-bis-(maleimido)-1,2-ethandiol, N,N'-4,4'-diphenylether-bis-maleimid, and 4,4'-bis(maleimido)-diphenylsulfone.

6. The gel polymer electrolyte precursor composition as claimed in claim 1, wherein the modified bismaleimide oligomer (a) is prepared by the reaction of barbituric acid with bismaleimide at 100~150° C. for 0.5~8 hours.

7. The gel polymer electrolyte precursor composition as claimed in claim 1, wherein the ingredient (b) comprises the acrylic/acrylate type monomer represented by $CH_2$═$C(R_0)C(O)O$—$(C_yH_{2y}O)_mR_1$, wherein y=1~3, m=1~9, $R_0$ is methyl, and $R_1$ is hydrogen.

8. The gel polymer electrolyte precursor composition as claimed in claim 7, wherein the ingredient (b) further comprises methyl methacrylate monomer.

9. The gel polymer electrolyte precursor composition as claimed in claim 1, wherein the ingredient (b) comprises methyl methacrylate monomer.

10. The gel polymer electrolyte precursor composition as claimed in claim 1, wherein the non-aqueous metal salt electrolyte (c) is selected from the group consisting of $LiPF_6$, $LiBF_4$, $LiAsF_6$, $LiSbF_6$, $LiClO_4$, $LiAlCl_4$, $LiGaCl_4$, $LiNO_3$, $LiC(SO_2CF_3)_3$, $LiN(SO_2CF_3)_2$, LiSCN, $LiO_3SCF_2CF_3$, $LiC_6F_5SO_3$, $LiO_2CCF_3$, $LiSO_3F$, $LiB(C_6H_5)_4$, $LiCF_3SO_3$ and a mixture thereof.

11. The gel polymer electrolyte precursor composition as claimed in claim 1, wherein the aprotic solvent (d) comprises a mixture solvent of two types of solvents, wherein the first type solvent has a high dielectric constant and a high viscosity, and the second type solvent has a relatively lower dielectric constant and a relatively lower viscosity; wherein the first type solvent is selected from the group consisting of ethylene carbonate (EC), propylene carbonate (PC), butylene carbonate, dipropyl carbonate, acid anhydride, N-methylpyrrolidone, N-methyl acetamide, N-methyl formamide, dimethyl formamide, γ-butyrolactone, acetonitrile, dimethyl sulfoxide and dimethyl sulfite; and the second type solvent is selected from the group consisting of ether, ester, and carbonate; wherein the ether is selected from the group consisting of 1,2-diethoxyethane, 1,2-dimethoxyethane, 1,2-dibutoxyethane, tetrahydrofuran, 2-methyl tetrahydrofuran, and propylene oxide; the ester is selected from the group consisting of methyl acetate, ethyl acetate, methyl butyrate, ethyl butyrate, methyl proionate, and ethyl propionate; and the carbonate is selected from the group consisting of dimethyl carbonate (DMC), diethyl carbonate (DEC) and ethyl methyl carbonate (EMC).

12. The gel polymer electrolyte precursor composition as claimed in claim 11, wherein the aprotic solvent (d) comprises ethylene carbonate (EC), propylene carbonate (PC), and diethyl carbonate (DEC).

13. The gel polymer electrolyte precursor composition as claimed in claim 12, wherein the aprotic solvent (d) comprises, based on volume, 10%-50% of ethylene carbonate (EC), 5%-80% of propylene carbonate (PC), and 3%-75% of diethyl carbonate (DEC).

14. The gel polymer electrolyte precursor composition as claimed in claim 1, wherein the free radical initiator (e) is selected from the group consisting of ketone peroxide, peroxy ketal, hydroperoxide, dialkyl peroxide, diacyl peroxide, peroxy ester, and azo compound.

15. The gel polymer electrolyte precursor composition as claimed in claim 1, wherein the free radical initiator (e) is selected from the group consisting of 2,2-azo-bis-isobutyronitrile (AIBN), phenyl-azo-triphenylmethane, t-butyl peroxide (TBP), cumyl peroxide, acetyl peroxide, benzoyl peroxide (BPO), lauroyl peroxide, t-butyl hydroperoxide, and t-butyl perbenzoate.

16. A polymer lithium secondary battery cell, which comprises:

i) a negative electrode capable of electrochemically migrating in/out alkali metal;

ii) a positive electrode including an electrode active material capable of electrochemically migrating in/out alkali metal; and iii) a gel polymer electrolyte capable of activating the negative electrode and the positive electrode, wherein the gel polymer electrolyte is prepared from a gel polymer electrolyte precursor composition as claimed in claim 1 by polymerization by heating.

17. The polymer lithium secondary battery cell as claimed in claim 16, wherein the negative electrode comprises a negative electrode active material selected from the group consisting of mesophase carbon microbeads (MCMB), vapor Grown varbon fiber (VGCF), carbon nano-tube (CNT), coke, carbon black, graphite, acetylene black, carbon fiber, and glassy carbon.

18. The polymer lithium secondary battery cell as claimed in claim 16, wherein the negative electrode further comprises a fluorine-containing resin binder.

19. The polymer lithium secondary battery cell as claimed in claim 16, wherein the electrode active material of the positive electrode is a lithium compound selected from the group consisting of oxide, sulfide, selenide, and telluride of vanadium, titanium, chromium, copper, molybdenum, niobium, iron, nickel, cobalt, or manganese.

20. The polymer lithium secondary battery cell as claimed in claim 17, wherein the positive electrode further comprises a fluorine-containing resin binder.

21. The polymer lithium secondary battery cell as claimed in claim 17, wherein the positive electrode further comprises an electrically conductive additive selected from the group consisting of acetylene black, carbon black, graphite, nickel powder, aluminum powder, titanium powder, and stainless steel powder, and a mixture thereof.

* * * * *

UNITED STATES PATENT AND TRADEMARK OFFICE
CERTIFICATE OF CORRECTION

PATENT NO. : 7,560,194 B2
APPLICATION NO. : 11/304708
DATED : July 14, 2009
INVENTOR(S) : Yueh-Wei Lin et al.

It is certified that error appears in the above-identified patent and that said Letters Patent is hereby corrected as shown below:

Title page, item [54] change "HIGH IONIC CONDUCTIVITY GEL POLYMER ELECTROLYTE FOR RECHARGEABLE POLYMBER SECONDARY BATTERY" to --HIGH IONIC CONDUCTIVITY GEL POLYMER ELECTROLYTE FOR RECHARGEABLE POLYMER SECONDARY BATTERY--

Signed and Sealed this

Thirteenth Day of October, 2009

David J. Kappos
*Director of the United States Patent and Trademark Office*

UNITED STATES PATENT AND TRADEMARK OFFICE

CERTIFICATE OF CORRECTION

PATENT NO. : 7,560,194 B2
APPLICATION NO. : 11/304708
DATED : July 14, 2009
INVENTOR(S) : Yueh-Wei Lin et al.

It is certified that error appears in the above-identified patent and that said Letters Patent is hereby corrected as shown below:

Title page, item [54] and at Column 1, lines 1-4, change "HIGH IONIC CONDUCTIVITY GEL POLYMER ELECTROLYTE FOR RECHARGEABLE POLYMBER SECONDARY BATTERY" to --HIGH IONIC CONDUCTIVITY GEL POLYMER ELECTROLYTE FOR RECHARGEABLE POLYMER SECONDARY BATTERY--

This certificate supersedes the Certificate of Correction issued October 13, 2009.

Signed and Sealed this

Third Day of November, 2009

David J. Kappos
*Director of the United States Patent and Trademark Office*